(12) United States Patent
Shibuya et al.

(10) Patent No.: US 7,160,937 B2
(45) Date of Patent: Jan. 9, 2007

(54) FLAME RETARDANT AROMATIC POLYCARBONATE RESIN COMPOSITION

(75) Inventors: Kazuhiro Shibuya, Yokohama (JP); Akira Miyamoto, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/504,297

(22) PCT Filed: Dec. 26, 2003

(86) PCT No.: PCT/JP03/17009

§ 371 (c)(1),
(2), (4) Date: Aug. 12, 2004

(87) PCT Pub. No.: WO2004/058894

PCT Pub. Date: Jul. 15, 2004

(65) Prior Publication Data

US 2005/0154103 A1    Jul. 14, 2005

(30) Foreign Application Priority Data

Dec. 26, 2002    (JP) .............................. 2002-376152

(51) Int. Cl.
- *C08K 5/09* (2006.01)
- *C08K 5/098* (2006.01)
- *C08K 5/10* (2006.01)
- *C08K 3/34* (2006.01)

(52) U.S. Cl. ..................... 524/161; 524/300; 524/302; 524/322; 524/394; 524/449; 524/451

(58) Field of Classification Search ................ 524/449, 524/161, 451, 300, 302, 322, 394
See application file for complete search history.

(56) References Cited

U.S. PATENT DOCUMENTS

| | | | | |
|---|---|---|---|---|
| 6,150,443 A | * | 11/2000 | Nodera et al. | 524/157 |
| 6,727,303 B1 | * | 4/2004 | Ono et al. | 524/261 |
| 6,780,917 B1 | * | 8/2004 | Hashimoto et al. | 524/456 |

FOREIGN PATENT DOCUMENTS

| | | |
|---|---|---|
| JP | 2-283760 A | 11/1990 |
| JP | 3-21664 A | 1/1991 |
| JP | 10-60248 A | 3/1998 |
| JP | 2002-80709 A | 3/2002 |
| JP | 2002-294063 A | 10/2002 |
| JP | 2003-82218 A | 3/2003 |
| JP | 2003-268226 A | 9/2003 |

\* cited by examiner

*Primary Examiner*—Peter Szekely
(74) *Attorney, Agent, or Firm*—Birch, Stewart, Kolasch & Birch, LLP

(57) ABSTRACT

An aromatic polycarbonate resin composition having: 100 parts by weight of a resin component (A) mainly having an aromatic polycarbonate, 0.1 to 200 parts by weight of a solid inorganic compound (B), at least one compound (C) selected from the group consisting of an organic acid, an organic acid ester, and an organic acid anhydride, 0.001 to 1 part by weight of at least one organic acid metal salt (D) selected from the group consisting of an organic acid alkali metal salt and an organic acid alkaline earth metal salt, and 0.01 to 1 part by weight of a fluoropolymer (E), wherein compound (C) is present in an amount wherein a mixture of compounds (B) and (C) exhibits a pH value of from 4 to 8.

9 Claims, No Drawings

FLAME RETARDANT AROMATIC POLYCARBONATE RESIN COMPOSITION

BACKGROUND OF THE INVENTION

1. Field of the Invention

The present invention relates to a flame retardant aromatic polycarbonate resin composition. More particularly, the present invention is concerned with an aromatic polycarbonate resin composition comprising: a resin component (A) mainly comprising an aromatic polycarbonate, a solid inorganic compound (B), at least one compound (C) selected from the group consisting of an organic acid, an organic acid ester; and an organic acid anhydride, at least one organic acid metal salt (D) selected from the group consisting of an organic acid alkali metal salt and an organic acid alkaline earth metal salt, and a fluoropolymer (E), wherein the compound (C) is present in an amount wherein a mixture of the inorganic compound (B) and the compound (C) exhibits a pH value of from 4 to 8. The aromatic polycarbonate resin composition of the present invention is advantageous not only in that it exhibits an excellent flame retardancy without using a bromine compound or a phosphorus compound as a flame retardant (especially when a very thin shaped article is produced using the aromatic polycarbonate resin composition of the present invention, the produced very thin shaped article exhibits an extremely high level of flame retardancy as compared to the case where a conventional aromatic polycarbonate resin composition is used), but also in that it exhibits excellent properties with respect to melt stability, thermal aging resistance, resistance to moist heat, stiffness and impact resistance. Therefore, the aromatic polycarbonate resin composition of the present invention can be advantageously used for producing various shaped articles, such as an injection-molded article, and an extrusion-molded article.

2. Prior Art

An aromatic polycarbonate is a resin which not only has excellent mechanical properties (e.g., impact resistance) but also has excellent heat resistance. Therefore, an aromatic polycarbonate has been widely used as materials for housings or parts of various computers (e.g., a desktop computer and a notebook computer), printers, word processors, copying machines and the like.

In recent years, with respect to a shaped article obtained from an aromatic polycarbonate, especially in the case where it is intended to use the shaped article as a housing, it has been strongly desired to reduce the thickness of the shaped article so as to reduce the weight thereof. However, a thin housing is likely to suffer distortion by external stress or under the load of the parts inside the housing. Therefore, there has been a strong demand for aromatic polycarbonates having high stiffness and high dimensional precision.

In an attempt to improve the stiffness and dimensional precision of an aromatic polycarbonate, a method has been proposed in which an inorganic compound, such as a glass fiber, a carbon fiber, talc, mica or wollastonite, is blended with an aromatic polycarbonate as a reinforcing agent and/or a filler.

However, an aromatic polycarbonate resin composition containing an inorganic compound poses a problem that, during the molding of the resin composition, the inorganic compound promotes the decomposition of the aromatic polycarbonate. Especially the use of a basic inorganic compound, such as talc or mica, in an aromatic polycarbonate resin composition poses a problem that the melt stability of the resin composition is markedly lowered, so that the properties of the resin composition are markedly impaired during the molding thereof.

For solving the above-mentioned problems, various proposals have been made for suppressing the lowering of the molecular weight of an aromatic polycarbonate (i.e., for suppressing the decomposition of an aromatic polycarbonate). For example, Unexamined Japanese Patent Application Laid-Open Specification No. Hei 2-283760 proposes the addition of a phosphorus compound; Unexamined Japanese Patent Application Laid-Open Specification No. Hei 3-21664 proposes the addition of an organic acid; and Unexamined Japanese Patent Application Laid-Open Specification No. Hei 10-60248 proposes the addition of a sulfonic acid phosphonium salt. However, even by these proposals, the melt stability of the resin composition, especially at high temperatures, was still unsatisfactory, so that the molding temperature of the resin composition is inevitably limited, that is, only a relatively low molding temperature can be employed.

On the other hand, with respect to aromatic polycarbonate resin compositions used for office automation machines, and electric and electronic appliances, it has been desired to achieve excellent flame retardancy as well as excellent stiffness and dimensional precision. Further, in recent years, from the viewpoint of environmental protection, it has been desired to develop a flame retardant aromatic polycarbonate resin composition which contains neither a bromine compound nor a phosphorus compound as a flame retardant.

For example, Unexamined Japanese Patent Application Laid-Open Specification No. 2002-80709 describes an aromatic polycarbonate resin composition which is obtained by blending an aromatic polycarbonate with an inorganic filler, an organophosphorus flame retardant and an alkali metal salt of an organic acid. This patent document describes that the flame retardancy of the obtained resin composition is "V-0" as measured in accordance with UL-94 standard with respect to a test specimen having a thickness of 0.8 mm. However, the resin composition described in this patent document is disadvantageous in that a phosphorus compound is used as a flame retardant, and that the properties of the resin composition are markedly lowered under high humidity and high temperature conditions.

Further, Unexamined Japanese Patent Application Laid-Open Specification No. 2002-294063 describes a resin composition which is obtained by blending an aromatic polycarbonate with a metal salt of an organic acid, an alkoxysilane compound, a fluorine-containing polymer, an inorganic filler, and optionally an organosiloxane compound. This patent document describes that, when the above-mentioned organosiloxane compound (optional component) is used, the flame retardancy of the obtained resin composition is "V-0" as measured in accordance with UL-94 standard with respect to a test specimen having a thickness of 0.8 mm. However, since the resin composition described in this patent document contains an organosiloxane compound which has a low heat stability, disadvantages are caused in that, when the resin composition is molten at high temperatures, the resin composition is likely to suffer discoloration and the amount of components volatilized from the molten resin composition increases.

Furthermore, Unexamined Japanese Patent Application Laid-Open Specification Nos. 2003-82218 and 2003-268226 describe a resin composition which is obtained by blending an aromatic polycarbonate with a fluorine-containing resin and a silicate compound. However, the resin composition described in each of these patent documents is unsatisfactory with respect to flame retardancy and melt stability.

As apparent from the above, in the prior art, it has been impossible to obtain an aromatic polycarbonate resin composition, which contains an inorganic compound, and which not only exhibits a high flame retardancy in the form of a very thin shaped article thereof without using a bromine compound or a phosphorus compound as a flame retardant (for example, "V-0" as measured in accordance with UL-94 standard with respect to a test specimen having a thickness of 1.2 mm, or "5VB" as measured in accordance with according to the UL-94 standard with respect to a test specimen having a thickness of 1.0 mm), but also has excellent melt stability and mechanical strength. Therefore, it has been desired to develop such an excellent aromatic polycarbonate resin composition.

SUMMARY OF THE INVENTION

In this situation, the present inventors have made extensive and intensive studies with a view toward solving the above-mentioned problems accompanying the prior art. As a result, it has surprisingly been found that, even without the use of a bromine compound or a phosphorus compound as a flame retardant, an aromatic polycarbonate resin composition having a specific formulation (especially in the form of a thin shaped article) not only has a very high flame retardancy (for example, "V-0" as measured in accordance with UL-94 standard with respect to a test specimen having a thickness of 1.2 mm, or "5VB" as measured in accordance with UL-94 standard with respect to a test specimen having a thickness of 1.0 mm) as compared to the conventional aromatic polycarbonate resin compositions, but also has a greatly improved melt stability and excellent properties with respect to thermal aging resistance, resistance to moist heat, stiffness and impact resistance. The above-mentioned aromatic polycarbonate resin composition having a specific formulation comprises a resin component (A) mainly comprising an aromatic polycarbonate, a solid inorganic compound (B), at least one compound (C) selected from the group consisting of an organic acid, an organic acid ester; and an organic acid anhydride, at least one organic acid metal salt (D) selected from the group consisting of an organic acid alkali metal salt and an organic acid alkaline earth metal salt, and a fluoropolymer (E), wherein compound (C) is present in an amount wherein a mixture of inorganic compound (B) and compound (C) exhibits a pH value of from 4 to 8. Based on this novel finding, the present invention has been completed.

Accordingly, it is an object of the present invention to provide an aromatic polycarbonate resin composition which not only has high flame retardancy (especially, a thin shaped article produced from the aromatic polycarbonate resin composition has extremely high flame retardancy as compared to that of a thin molded article produced from a conventional aromatic polycarbonate resin composition), but also has excellent properties with respect to melt stability, thermal aging resistance, resistance to moist heat, stiffness and impact resistance.

The foregoing and other objects, features and advantages of the present invention will be apparent from the following detailed description and claims.

DETAILED DESCRIPTION OF THE INVENTION

According to the present invention, there is provided an aromatic polycarbonate resin composition comprising:
  100 parts by weight of a resin component (A) mainly comprising an aromatic polycarbonate,
  0.1 to 200 parts by weight of a solid inorganic compound (B),
  at least one compound (C) selected from the group consisting of an organic acid, an organic acid ester, and an organic acid anhydride,
  0.001 to 1 part by weight of at least one organic acid metal salt (D) selected from the group consisting of an organic acid alkali metal salt and an organic acid alkaline earth metal salt, and
  0.01 to 1 part by weight of a fluoropolymer (E),
  wherein the compound (C) is present in an amount wherein a mixture of the inorganic compound (B) and the compound (C) exhibits a pH value of from 4 to 8.

For easy understanding of the present invention, the essential features and various preferred embodiments of the present invention are enumerated below.

1. An aromatic polycarbonate resin composition comprising:
    100 parts by weight of a resin component (A) mainly comprising an aromatic polycarbonate,
    0.1 to 200 parts by weight of a solid inorganic compound (B),
    at least one compound (C) selected from the group consisting of an organic acid, an organic acid ester, and an organic acid anhydride,
    0.001 to 1 part by weight of at least one organic acid metal salt (D) selected from the group consisting of an organic acid alkali metal salt and an organic acid alkaline earth metal salt, and
    0.01 to 1 part by weight of a fluoropolymer (E),
    wherein the compound (C) is present in an amount wherein a mixture of the inorganic compound (B) and the compound (C) exhibits a pH value of from 4 to 8.
2. The aromatic polycarbonate resin composition according to item 1 above, wherein the solid inorganic compound (B) is at least one silicate compound selected from the group consisting of a plate-shaped silicate compound, a needle-shaped silicate compound and a fibrous silicate compound.
3. The aromatic polycarbonate resin composition according to item 2 above, wherein the at least one silicate compound is selected from the group consisting of talc, mica, a glass flake and a glass fiber.
4. The aromatic polycarbonate resin composition according to item 3 above, wherein the at least one silicate compound is selected from the group consisting of talc and mica.
5. The aromatic polycarbonate resin composition according to any one of items 1 to 4 above, wherein the compound (C) is selected from the group consisting of an organic sulfonic acid, an organic sulfonic acid ester and an organic carboxylic acid.
6. The aromatic polycarbonate resin composition according to any one of items 1 to 5 above, wherein the amount of the solid inorganic compound (B) is 1 to 20 parts by weight.
7. An injection molded article comprising the aromatic polycarbonate resin composition of any one of items 1 to 6 above.

8. An extrusion molded article comprising the aromatic polycarbonate resin composition of any one of items 1 to 6.

Hereinbelow, the present invention is described in detail.

First, explanations are given below with respect to component (A).

In the present invention, component (A) is a resin component mainly comprising an aromatic polycarbonate.

In the present invention, the "resin component mainly comprising an aromatic polycarbonate" means a resin containing more than 50 parts by weight, relative to 100 parts by weight of the resin component, of an aromatic polycarbonate. Component (A) may contain only an aromatic polycarbonate, or may further contain a thermoplastic resin other than an aromatic polycarbonate.

As component (A), it is preferred to use an aromatic polycarbonate which is obtained from an aromatic dihydroxy compound. Specific examples of aromatic dihydroxy compounds include bis(hydroxyaryl)alkanes, such as 1,1-bis(4-hydroxy-t-butylphenyl)propane and 2,2-bis(4-hydroxyphenyl)propane; bis(hydroxyaryl)cycloalkanes, such as 1,1-bis(4-hydroxyphenyl)cyclopentane and 1,1-bis(4-hydroxyphenyl)cyclohexane; dihydroxyaryl ethers, such as 4,4'-dihydroxydiphenyl ether and 4,4'-dihydroxy-3,3'-dimethylphenyl ether; dihydroxyaryl sulfides, such as 4,4'-dihydroxydiphenyl sulfide and 4,4'-dihydroxy-3,3'-dimethylphenyl sulfide; dihydroxyaryl sulfoxides, such as 4,4'-dihydroxydiphenyl sulfoxide and 4,4'-dihydroxy-3,3'-dimethylphenyl sulfoxide; and dihydroxyaryl sulfones, such as 4,4'-dihydroxydiphenyl sulfone and 4,4'-dihydroxy-3,3'-dimethylphenyl sulfone.

Among these aromatic dihydroxy compounds, 2,2-bis(4-hydroxyphenyl)propane (the so-called "bisphenol A") is most preferred. These aromatic dihydroxy compounds can be used individually or in combination.

In the present invention, aromatic polycarbonates which are preferably used as component (A) can be produced by any conventional methods. Examples of conventional methods include an interfacial polymerization process (e.g., phosgene process) in which an aromatic dihydroxy compound and a carbonate precursor (e.g., phosgene) are reacted with each other in the presence of an aqueous sodium hydroxide solution and methylene chloride as a solvent; a transesterification process (melt process) in which an aromatic dihydroxy compound and a carbonic diester (e.g., a diphenyl carbonate) are reacted with each other; a solid-phase polymerization process in which a carbonate prepolymer obtained by the phosgene process or by the melt process is crystallized and subjected to a solid-phase polymerization (Unexamined Japanese Patent Application Laid-Open Specification No. Hei 1-158033 (corresponding to U.S. Pat. No. 4,948,871)); a method described in Unexamined Japanese Patent Application Laid-Open Specification No. Hei 1-271426; and a method described in Unexamined Japanese Patent Application Laid-Open Specification No. Hei 3-68627 (corresponding to U.S. Pat. No. 5,204,377)).

As an aromatic polycarbonate resin which is especially preferred as component (A), there can be mentioned an aromatic polycarbonate resin produced from a dihydric phenol (an aromatic dihydroxy compound) and a carbonic diester by a transesterification process. Such an aromatic polycarbonate resin contains substantially no chlorine atoms.

The weight average molecular weight of the aromatic polycarbonate used in the present invention is generally from 5,000 to 500,000, preferably from 10,000 to 100,000, more preferably from 13,000 to 50,000, still more preferably from 15,000 to 30,000, still more preferably from 17,000 to 25,000, most preferably 17,000 to 20,000.

In the present invention, the weight average molecular weight (Mw) of the aromatic polycarbonate can be measured by gel permeation chromatography (GPC) as follows. A calibration curve is obtained with respect to standard monodisperse polystyrene samples using a polystyrene gel column and tetrahydrofuran as a solvent. The obtained calibration curve is modified by a calculation using the following formula:

$$M_{PC} = 0.3591 M_{PS}^{1.0388}$$

wherein $M_{PC}$ represents the molecular weight of an aromatic polycarbonate and $M_{PS}$ represents the molecular weight of a polystyrene, thereby obtaining a modified calibration curve for a polycarbonate. The weight average molecular weight of a polycarbonate is measured by GPC using the obtained modified calibration curve.

Further, in the present invention, as component (A), two or more types of polycarbonates having different molecular weights can be used in combination. For example, an aromatic polycarbonate usable as a raw material for producing an optical disk, which in general has a weight average molecular weight (Mw) of from 14,000 to 16,000, can be used in combination with an aromatic polycarbonate usable as a raw material for producing an injection-molded article or an extrusion-molded article, which in general has a weight average molecular weight (Mw) of from 20,000 to 50,000.

Examples of thermoplastic resins (other than an aromatic polycarbonate) which can be preferably used in component (A) (which is comprised mainly of any of the above-mentioned aromatic polycarbonates) include a polystyrene resin; a high impact polystyrene (HIPS) resin; an acrylonitrile/styrene copolymer resin (AS resin); a butyl acrylate/acrylonitrile/styrene copolymer resin (such as BAAS resin and AAS resin); an acrylonitrile/butadiene/styrene copolymer resin (ABS resin); a methyl methacrylate/butadiene/styrene copolymer resin (MBS resin); polyester resins, such as a polyethylene terephthalate and a polybutylene terephthalate; a polyamide resin; a polymethyl methacrylate resin; a polyarylate resin; a core-shell elastomer used as an impact modifier, and a silicone elastomer. Among these thermoplastic elastomers, from the viewpoint of improving the fluidity of the resin composition, it is especially preferred to use an AS resin and/or a BAAS resin. From the viewpoint of improving the impact resistance of the resin composition, it is preferred to use an ABS resin and/or an MBS resin. From the viewpoint of improving the chemical resistance of the resin composition, it is preferred to use a polyester resin.

With respect to the above-mentioned resin component (A) comprised mainly of an aromatic polycarbonate, the amount of the thermoplastic resin (other than an aromatic polycarbonate) contained therein is preferably from 0.1 to 30 parts by weight, more preferably from 0.5 to 20 parts by weight, still more preferably from 1 to 15 parts by weight, relative to 100 parts by weight of the resin component (A).

Next, an explanation is given below with respect to component (B).

In the present invention, component (B) is a solid inorganic compound.

In the present invention, by virtue of the use of component (B), the aromatic polycarbonate resin composition not only has high flame retardancy, but also is improved with respect to stiffness and strength (due to the function of the component (B) as a reinforcing agent) and improved with respect to dimensional precision (due to the function of component (B) as a filler).

In the present invention, component (B) may be in any of various forms, such as a fiber, a needle, a plate or a sphere, and is preferably in the form of a needle or a plate.

Examples of components (B) in the form of a fiber or a needle include a glass fiber, a carbon fiber, an aluminum borate whisker, a calcium titanate whisker, a rock wool, a silicon nitride whisker, a boron fiber, a tetrapod-shaped zinc oxide whisker, and wollastonite.

Examples of components (B) in the form of a plate include talc, mica, pearl mica, glass flake and kaolin.

Examples of components (B) which are spherical (or substantially spherical) include glass beads, a glass balloon, carbon black, a glass powder and silica (a natural silica and a synthesized silica).

In the present invention, as component (B), there can be mentioned a compound which has been surface-modified for improving the affinity thereof with the aromatic carbonate matrix of the resin composition of the present invention at an interface between component (B) and the aromatic carbonate matrix. The surface modification can be performed, for example, by a method in which a lipophilic organic compound is adsorbed onto the surface of component (B), or by a method in which component (B) is treated with a silane coupling agent or a titanate coupling agent.

In the present invention, as component (B), it is preferred to use a carbon fiber or silicate compounds, such as talc, mica, pearl mica, wollastonite, kaolin, a glass fiber and a glass flake, more advantageously the above-mentioned silicate compounds.

Among the above-mentioned silicate compounds which can be preferably used as component (B), it is especially preferred to use a silicate compound containing a metal oxide and $SiO_2$. With respect to such a silicate compound containing a metal oxide and $SiO_2$, the silicate ion contained therein may be present in any form. For example, each silicate ion may be in the form of an orthosilicate, a disilicate, a ring silicate, a chain silicate or a laminated silicate.

The above-mentioned silicate compound may be in the form of a compound oxide, an oxyacid salt or a solid solution. The above-mentioned composite oxide may either be a mixture of 2 or more different oxides, or a mixture of an oxide and an oxyacid salt. The above-mentioned solid solution may either be a solid solution comprising 2 or more different metal oxides, or a solid solution comprising 2 or more different oxyacid salts.

The above-mentioned silicate compound may be a hydrate. With respect to such a hydrate, the water of crystallization contained therein may be in any form. For example, the water of crystallization may be in the form of a hydrogen silicate ion (i.e., in the form of an Si—OH), a hydroxide ion ($OH^-$) derived from a metal hydroxide, and a water molecule which is present in the voids of the hydrate.

As the above-mentioned silicate compound, either a natural compound or a synthesized compound may be used. As a synthesized compound, there can be mentioned a silicate compound obtained by a conventional synthesis method, such as a solid reaction method, a hydrothermal reaction method or an ultrahigh-pressure reaction method.

In the present invention, as component (B), it is most preferred to use a silicate compound having a composition which is represented by the following formula (1):

$$xMO \cdot ySiO_2 \cdot zH_2O \qquad (1)$$

wherein each of x and y independently represents a natural number, z represents an integer of 0 or more, and MO represents a metal oxide component, wherein MO may contain a plurality of different metal oxides.

Examples of metals M contained in the above-mentioned metal oxide component MO include potassium, sodium, lithium, barium, calcium, zinc, manganese, iron, cobalt, magnesium, zirconium, aluminum and titanium.

With respect to the silicate compound represented by formula (1) above, it is preferred that the silicate compound contains CaO and/or MgO as the metal oxide component MO. Further, it is more preferred that the silicate compound contains substantially only CaO and/or MgO as the metal oxide component MO, and it is most preferred that the silicate compound contains substantially only MgO as the oxide component MO.

Specific examples of silicate compounds which can be preferably used as component (B) include talc, mica, wollastonite, xonotlite, kaolin clay, montmorillonite, bentonite, sepiolite, imogolite, sericite, lawsonite and smectite.

As mentioned above, the silicate compound as component (B) may be used in any form (e.g., a plate, a needle, a sphere and a fiber). However, the silicate compound is preferably in the form of a plate, a needle and a fiber, most preferably in the form of plate-shaped particles.

In the present invention, the term "plate-shaped particles" means particles in which the ratio (a)/(c) (wherein (a) is the average particle diameter of the particles as measured in terms of a median diameter of the particles wherein the median diameter is obtained by the below-mentioned method, and (c) is the average thickness of the particles) is in the range of from 5 to 500, preferably from 10 to 300, more preferably from 20 to 200.

In the present invention, the above-mentioned average particle diameter (a) of component (B) is preferably in the range of from 0.001 to 500 μm, more preferably from 0.01 to 100 μm, still more preferably from 0.1 to 50 μm, most preferably from 1 to 30 μm.

The above-mentioned average particle diameter (a) of component (B) is measured by either of the below-mentioned two methods, depending on the approximate distribution range of the particle diameters of the component (B).

When the particle diameters of component (B) are distributed in the range of from 0.001 to 0.1 μm, the average particle diameter (a) can be measured as follows. A photomicrograph of component (B) is taken using a transmission electron microscope, and the areas of 100 or more inorganic compound particles on the photomicrograph are measured. From the measured areas of the magnified particles, the actual areas (S) of the particles are obtained by dividing the measured areas of the magnified particles by the magnification of the microscope. From the thus obtained actual areas S, the particle diameters of the inorganic compound particles are calculated by the formula $(4S/\pi)^{0.5}$. From the calculated diameters of the inorganic compound particles, the number average particle diameter of the particles is calculated and defined as the average particle diameter (a) of component (B).

When the particle diameters of component (B) are distributed in the range of from 0.1 to 300 μm, particle diameters of the inorganic compound particles can be measured by a laser diffraction method (e.g., a method using a laser diffraction particle size analyzer "SALD-2000" manufactured and sold by Shimadzu Corporation, Japan), and the median diameter of the measured particle diameters is calculated from the measured particle diameters and defined as the average diameter (a).

In the present invention, the thickness (c) of component (B) in the form of plate-shaped particles is preferably from 0.01 to 100 μm, more preferably from 0.03 to 10 μm, still more preferably from 0.05 to 5 μm, most preferably from 0.1 to 3 μm.

The thickness of component (B) in the form of plate-shaped particles can be measured as follows. A photomicrograph of the component (B) is taken using a transmission electron microscope, and the thicknesses of 10 or more inorganic compound particles on the photomicrograph are measured. From the measured thicknesses of the magnified inorganic particles, the actual thicknesses of the inorganic particles are calculated by dividing the measured thicknesses of the particles by the magnification of the microscope. Then, an average value of the actual thicknesses is calculated and the obtained average value is defined as thickness (c) of plate-shaped particles as component (B).

Among the plate-shaped silicate compounds which are usable as component (B), most preferred are talc and mica.

A talc which is especially preferred as component (B) is a hydrous magnesium silicate having a laminate structure, which is represented by the following chemical formula: $4SiO_2 \cdot 3MgO \cdot H_2O$. Such a hydrous magnesium silicate generally contains about 63% by weight of $SiO_2$, about 32% by weight of $MgO$, about 5% by weight of $H_2O$, and other metal oxides, such as $Fe_2O_3$, $CaO$ and $Al_2O_3$, and has a specific gravity of about 2.7.

Further examples of talcs which can be preferably used as component (B) include a calcined talc and a purified talc which has impurities removed therefrom by washing with an acid, such as hydrochloric acid and sulfuric acid. Still further examples of talcs which can be preferably used as component (B) include a talc having its surface rendered hydrophobic by a surface treatment with a silane coupling agent or a titanate coupling agent.

On the other hand, as a mica which is especially preferred as component (B), there can be mentioned crushed particles of a silicate mineral containing aluminum, potassium, magnesium, sodium, iron and the like. Specific examples of such micas include muscovite (chemical formula: $K(AlSi_3O_{10})(OH)_2Al_4(OH)_2(AlSi_3O_{10})K$), phlogopite (chemical formula: $K(AlSi_3O_{10})(OH)_2Mg_6(OH)_2—(AlSi_3O_{10})K$), biotite (chemical formula: $K(AlSi_3O_{10})(OH)_2(Mg,Fe)_6(OH)_2(AlSi_3O_{10})K$) and synthetic mica (fluorine-phlogopite; chemical formula: $K(AlSi_3O_{10})(OH)_2F_2Mg_6F_2(AlSi_3O_{10})K$). In the present invention, any of these micas can be used; however, muscovite is preferred.

Further, the above-mentioned mica may have its surface rendered hydrophobic by a surface treatment with a silane coupling agent or a titanate coupling agent.

In the present invention, the amount of component (B) is from 0.1 to 200 parts by weight, preferably from 0.3 to 100 parts by weight, more preferably from 0.5 to 50 parts by weight, still more preferably from 0.8 to 30 parts by weight, most preferably from 1 to 20 parts by weight, relative to 100 parts by weight of component (A). When the amount of component (B) is more than 200 parts by weight, disadvantages are caused in that the melt stability of the aromatic polycarbonate resin composition is markedly lowered and the mechanical properties of the resin composition having experienced the melting are inevitably lowered. On the other hand, when the amount of component (B) is less than 0.1 part by weight, the flame retardancy of the resin composition is lowered, thus rendering it impossible to achieve a high level of flame retardancy which is aimed at in the present invention.

When the aromatic polycarbonate resin composition of the present invention is used as a raw material for producing an injection-molded article, from the view-point of obtaining an injection-molded article which not only has excellent properties with respect to flame retardancy, melt stability, thermal aging resistance and resistance to moist heat, but also has excellent weld strength and good appearance, it is especially preferred that the amount of component (B) is in the range of from 1 to 20 parts by weight, relative to 100 parts by weight of component (A).

Further, in the present invention, when a plate-shaped compound, such as a talc or mica, is used as component (B), the obtained aromatic polycarbonate resin composition is advantageous not only in that, even when the resin composition is in the form of a very thin shaped article, the resin composition has excellent flame retardancy, but also in that the resin composition is improved with respect to impact resistance, dimensional stability and electrical properties, such as insulating properties and tracking resistance (i.e., the resistance to the formation of a carbonized, electrically conductive path between two electrodes (having a potential difference) on the surface of an insulating material). Therefore, in the present invention, it is most preferred to use talc or mica as component (B).

Next, an explanation is given below with respect to component (C).

In the present invention, component (C) is at least one compound selected from the group consisting of an organic acid, an organic acid ester, and an organic acid anhydride. In the present invention, by using component (C) in combination with the above-mentioned component (B), wherein component (C) is used in an amount wherein a mixture of component (B) and component (C) exhibits a pH value of from 4 to 8, it has become possible to improve greatly the flame retardancy and melt stability of an aromatic polycarbonate resin composition.

Examples of organic acids which can be used as component (C) include organic compounds, each independently having at least one functional group selected from the group consisting of an $—SO_3H$ group, a $—COOH$ group and a $—POH$ group. Specific examples of such organic compounds include organic sulfonic acids, organic carboxylic acids and organic phosphoric acids. Among these organic compounds, organic sulfonic acids and organic carboxylic acids are preferred, and organic sulfonic acids are most preferred.

The above-mentioned organic acid esters, and organic acid anhydrides, which can be used as component (C), are derivatives of the above-mentioned organic acids. In the present invention, it is presumed that, when any of the above-mentioned organic acid derivatives are used as component (C), the component (C) is decomposed during the molding of the aromatic polycarbonate resin composition of the present invention, so that the component (C) functions as an acid. Therefore, for example, when a basic inorganic compound is used as component (B), component (C) neutralizes component (B). Thus, in the present invention, component (C) functions as a pH adjuster.

In the present invention, component (C) may be any of a monomer, an oligomer and a polymer.

Further, in the present invention, as component (C), two or more types of compounds can be used in combination.

In the present invention, as component (C), it is especially preferred to use at least one compound selected from the group consisting of an organic sulfonic acid, organic sulfonic acid derivatives (such as an organic sulfonic acid ester) and an organic carboxylic acid.

When an organic sulfonic acid and/or an organic sulfonic acid ester are/is used as component (C), the aromatic polycarbonate resin composition of the present invention exhibits an excellent melt stability, and the generation of volatile substances can be suppressed. Therefore, in such a case, the range of temperature employable for the molding of the resin composition becomes broad, and the final molded article has an excellent appearance.

Examples of organic sulfonic acids which can be preferably used as component (C) include aromatic sulfonic acids, such as benzenesulfonic acid, p-toluenesulfonic acid, xylenesulfonic acid, naphthalenesulfonic acid, diisopropylnaphthalenesulfonic acid, diisobutylnaphthalenesulfonic acid and dodecylbenzenesulfonic acid; and polymeric or oligomeric organic sulfonic acids, such as $C_8$–$C_{18}$ aliphatic sulfonic acids, sulfonated polystyrenes and methyl acrylate/sulfonated styrene copolymer.

Examples of organic sulfonic acid esters which are usable as component (C) include methyl benzenesulfonate, ethyl benzenesulfonate, propyl benzenesulfonate, butyl benzenesulfonate, octyl benzenesulfonate, phenyl benzenesulfonate, methyl p-toluenesulfonate, ethyl p-toluenesulfonate, propyl p-toluenesulfonate, butyl p-toluenesulfonate, octyl p-toluenesulfonate, phenyl p-toluenesulfonate, methyl naphthalenesulfonate, ethyl naphthalenesulfonate, propyl naphthalenesulfonate, butyl naphthalenesulfonate, 2-phenyl-2-propyl dodecylbenzenesulfonate and 2-phenyl-2-butyl dodecylbenzenesulfonate.

Examples of organic sulfonic acid ammonium salts which are usable as component (C) include decylammonium butylsulfonate, decylammonium decylsulfonate, dodecylammonium methylsulfonate, dodecylammonium ethylsulfonate, dodecylmethylammonium methylsulfonate, dodecyldimethylammonium tetradecylsulfonate, tetradecyldimethylammonium methylsulfonate, tetramethylammonium hexylsulfonate, decyltrimethylammonium hexadecylsulfonate, tetrabutylammonium dodecylbenzylsulfonate, tetraethylammonium dodecylbenzylsulfonate and tetramethylammonium dodecylbenzylsulfonate.

Further, preferred examples of organic sulfonic acids usable as component (C) include those which have an —OH group, an —NH$_2$ group, a —COOH group, a halogen group or the like in addition to an —SO$_3$H group. Specific examples of such organic sulfonic acids include naphthol sulfonic acid, sulfamic acid, naphthylamine sulfonic acid, sulfobenzoic acid, organic sulfonic acids having a perchlorinated hydrocarbon group or a partially chlorinated hydrocarbon group, and organic sulfonic acids having a perfluorinated hydrocarbon group or a partially fluorinated hydrocarbon group.

As component (C), it is especially preferred to use aromatic sulfonic acids, such as benzenesulfonic acid, p-toluenesulfonic acid and naphthalensulfonic acid.

In the present invention, the amount of component (C), based on the amount of component (B), is very important. When the amount of component (C) is too small or too large, it becomes impossible to achieve the desired excellent effects of the present invention (i.e., it becomes impossible to achieve simultaneously excellent flame retardancy, excellent melt stability, excellent thermal aging resistance and excellent resistance to moist heat). Specifically, with respect to the aromatic polycarbonate resin composition of the present invention, component (C) is present in an amount wherein a mixture of component (B) and component (C) exhibits a pH value of from 4 to 8. The pH value of the above-mentioned mixture can be measured in accordance with JIS K5101.

In JIS K5101, two types of pH measurement methods are prescribed, namely, the boiling method and the room temperature method. In the present invention, the measurement of the pH of the above-mentioned mixture is performed by the above-mentioned boiling method.

Further, in the measurement of the pH value of the above-mentioned mixture in which the pH is measured with respect to an aqueous solution of the mixture of component (B) and component (C), when component (C) has a poor solubility in water and only an aqueous suspension is obtained by addition of the above-mentioned mixture to water, the pH value can be measured by a method in which the aqueous suspension is dispersed in an alcohol, and the pH value of the resultant dispersion is measured.

In the present invention, due to the above-mentioned requirement of the pH value of the mixture of components (B) and (C), an appropriate amount of component (C) varies depending on the type, shape and amount of component (B) used, and the type of component (C) used.

In the present invention, component (C) is preferably used in an amount wherein the mixture of component (B) and component (C) exhibits a pH value of from 4.2 to 7.8, more preferably from 4.3 to 7.6, still more preferably from 4.4 to 7.4, most preferably from 4.5 to 7.2.

When component (C) is used in an amount wherein the mixture of component (B) and component (C) exhibits a pH value of less than 4 or more than 8, the resultant aromatic polycarbonate resin composition is disadvantageous not only in that the desired excellent properties of the resin composition of the present invention cannot be achieved (i.e., all of the flame retardancy, melt stability, thermal aging resistance and resistance to moist heat of the resin composition are lowered), but also in that a shaped article produced from the resin composition suffers silver streaks, so that the appearance of the shaped article becomes markedly poor.

Next, an explanation is given below with respect to component (D).

In the present invention, component (D) is at least one organic acid metal salt selected from the group consisting of an organic acid alkali metal salt and an organic acid alkaline earth metal salt. Component (D) promotes the decarboxylation of the above-mentioned resin component (A) during the combustion of the aromatic polycarbonate resin composition of the present invention, thereby improving the flame retardancy of the resin composition.

Preferred examples of organic acid metal salts which are usable as component (D) include metal salts of organic sulfonic acids and metal salts of sulfuric esters. These organic acid metal salts can be used individually or in combination.

Examples of alkali metals contained in component (D) include lithium, sodium, potassium, rubidium and cesium. On the other hand, examples of alkaline earth metals contained in component (D) include beryllium, magnesium, calcium, strontium and barium. In the present invention, alkali metal(s) contained in component (D) is preferably lithium, sodium and potassium, more preferably sodium and potassium.

Preferred examples of the above-mentioned metal salts of organic sulfonic acids include alkali/alkaline earth metal salts of aliphatic sulfonic acids and alkali/alkaline earth metal salts of aromatic sulfonic acids. In the present specification, the term "alkali/alkaline earth metal salts" is used to indicate both alkali metal salts and alkaline earth metal salts.

Preferred examples of alkali/alkaline earth metal salts of aliphatic sulfonic acids include alkali/alkaline earth metal salts of $C_1$–$C_8$ alkane sulfonic acids; alkali/alkaline earth metal salts of $C_1$–$C_8$ alkane sulfonic acids, wherein each alkyl group thereof is partially fluorinated; and alkali/alkaline earth metal salts of $C_1$–$C_8$ perfluoroalkane sulfonic acids. Specific examples of these alkali/alkaline earth metal salts of aliphatic sulfonic acids include sodium perfluoroethanesulfonate and potassium perfluorobutanesulfonate.

Examples of alkali/alkaline earth metal salts of aromatic sulfonic acids include alkali/alkaline earth metal salts of aromatic sulfonic acids selected from the group consisting of sulfonic acids of monomeric or polymeric aromatic sulfides, sulfonic acids of aromatic carboxylic acids or esters thereof, sulfonic acids of monomeric or polymeric aromatic ethers, sulfonic acids of aromatic sulfonates, monomeric or polymeric aromatic sulfonic acids, sulfonic acids of monomeric or polymeric aromatic sulfones, sulfonic acids of aromatic ketones, heterocyclic sulfonic acids, sulfonic acids of aromatic sulfoxides, and condensation products of aromatic sulfonic acids in which the aromatic sulfonic acid monomers are bonded through methylene linkages.

Preferred examples of alkali/alkaline earth metal salts of the above-mentioned sulfonic acids of monomeric or polymeric aromatic sulfides include disodium diphenylsulfide-4,4'-disulfonate and dipotassium diphenylsulfide-4,4'-disulfonate.

Preferred examples of alkali/alkaline earth metal salts of the above-mentioned sulfonic acids of aromatic carboxylic acids or esters thereof include disodium 5-sulfoisophthalate, sodium 5-sulfoisophthalate, and polysodium polyethylene terephthalate polysulfonate.

Preferred examples of alkali/alkaline earth metal salts of the above-mentioned sulfonic acids of monomeric or polymeric aromatic ethers include calcium 1-methoxynaphthalene-4-sulfonate, disodium 4-dodecylphenyletherdisulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, and lithium poly(2-fluoro-6-butylphenyleneoxide)polysulfonate.

Preferred examples of alkali/alkaline earth metal salts of the above-mentioned sulfonic acids of aromatic sulfonates include potassium salts of benzenesulfonate sulfonic acid.

Preferred examples of alkali/alkaline earth metal salts of the above-mentioned monomeric or polymeric aromatic sulfonic acids include sodium benzenesulfonate, potassium benzenesulfonate, strontium benzenesulfonate, magnesium benzenesulfonate, dipotassium p-benzenedisulfonate, naphthalene-2,6-disulfonic acid di-potassium salt, biphenyl-3,3'-disulfonic acid calcium salt, sodium toluenesulfonate, potassium toluenesulfonate and potassium xylenesulfonate.

Preferred examples of alkali/alkaline earth metal salts of the above-mentioned sulfonic acids of monomeric or polymeric aromatic sulfones include sodium di-phenylsulfone-3-sulfonate, potassium diphenylsulfone-3-sulfonate, dipotassium diphenylsulfone-3,3'-disulfonate and dipotassium diphenylsulfone-3,4'-disulfonate.

Preferred examples of alkali/alkaline earth metal salts of the above-mentioned sulfonic acids of aromatic ketones include sodium α,α,α-trifluoroacetophenone-4-sulfonate and dipotassium benzophenone-3,3'-disulfonate.

Preferred examples of alkali/alkaline earth metal salts of the above-mentioned heterocyclic sulfonic acids include disodium thiophene-2,5-disulfonate, dipotassium thiophene-2,5-disulfonate, calcium thiophene-2,5-disulfonate, and sodium benzothiophenesulfonate.

Preferred examples of alkali/alkaline earth metal salts of the above-mentioned sulfonic acids of aromatic sulfoxides include potassium diphenylsulfoxide-4-sulfonate.

Preferred examples of the above-mentioned condensation products of alkali/alkaline earth metal salts of aromatic sulfonic acids include a condensation product of sodium naphthalene sulfonate with formalin and a condensation product of sodium anthracenesulfonate with formalin.

On the other hand, preferred examples of alkali/alkaline earth metal salts of sulfuric esters which are usable as component (D) include alkali/alkaline earth metal salts of sulfuric esters of monohydric alcohols and/or polyhydric alcohols. Specific examples of the above-mentioned sulfuric esters of monohydric alcohols and/or polyhydric alcohols include methyl sulfate, ethyl sulfate, lauryl sulfate, hexadecyl sulfate, sulfuric esters of a polyoxyethylene alkyl phenyl ether, mono-, di-, tri- and tetrasulfuric esters of pentaerythritol, sulfuric esters of lauric acid monoglyceride, sulfuric esters of palmitinic acid monoglyceride, and sulfuric esters of stearic acid monoglyceride. In the present invention, as component (D), alkali/alkaline earth metal salts of lauryl sulfate are especially preferred.

Further examples of alkali/alkaline earth metal salts usable as component (D) (which are other than those mentioned above) include alkali/alkaline earth metal salts of aromatic sulfonamides, such as saccharin, N-(p-tolylsulfonyl)-p-toluenesulfoimide, N-(N'-benzylaminocarbonyl)sulfanilimide, and N-(phenylcarboxyl) sulfanilimide.

Among the above-mentioned alkali/alkaline earth metal salts which are usable as component (D), preferred are alkali/alkaline earth metal salts of aromatic sulfonic acids and alkali/alkaline earth metal salts of perfluoroalkane sulfonic acid.

In the present invention, the amount of component (D) is from 0.001 to 1 part by weight, preferably from 0.005 to 0.8 part by weight, more preferably from 0.01 to 0.7 part by weight, still more preferably from 0.03 to 0.5 part by weight, still more preferably from 0.05 to 0.3 part by weight, most preferably from 0.06 to 0.2 part by weight, relative to 100 parts by weight of component (A). When the amount of component (D) is more than 1 part by weight, the melt stability of the resin composition is markedly lowered and the mechanical properties of the resin composition having experienced the melting inevitably become lowered. On the other hand, when the amount of component (D) is less than 0.001 part by weight, the flame retardancy of the resin composition is lowered, rendering it impossible to achieve an excellent flame retardancy, which is aimed at in the present invention.

Next, an explanation is given below with respect to component (E).

In the present invention, component (E) is a fluoropolymer which is used for preventing the dripping of flaming particles when the resin composition is on fire. As component (E), it is preferred to use a fluoropolymer having a fibril-forming ability. Specific examples of such fluoropolymers include tetrafluoroethylene polymers, such as a polytetrafluroethylene and a tetrafluoroethylene/propylene copolymer. Among these, especially preferred is a polytetrafluoroethylene.

The above-mentioned fluoropolymers usable as component (E) may be in any of various forms, such as a fine powder, an aqueous dispersion, and a powder mixture with another resin(s), such as acrylonitrile/styrene copolymer (AS) and polymethyl methacrylate (PMMA).

Preferred examples of aqueous fluoropolymer dispersions which are usable as component (E) include Teflon™ 30J (manufactured and sold by DuPont-Mitsui Fluorochemicals Company Limited, Japan), Polyflon™ D-1, Polyflon™ D-2, Polyflon™ D-2C and Polyflon™ D-2CE (each of which is manufactured and sold by Daikin Industries, Ltd., Japan).

As mentioned above, in the present invention, it is possible to use a fluoropolymer in the form of a powder mixture with another resin(s) (e.g., AS resin and PMMA resin) as component (E). Such fluoropolymers in the form of a powder mixture with another resin(s) are described in, for example, Unexamined Japanese Patent Application Laid-Open Specification Nos. Hei 9-95583 (corresponding to U.S. Pat. No. 5,804,654), Hei 11-49912 (corresponding to U.S. Pat. No. 6,040,370), 2000-143966 and 2000-297189. Specific examples of such powder mixtures include Blendex™ 449 (manufactured and sold by GE Speciality Chemicals, U.S.A.), and Metablen™ A-3800 (manufactured and sold by Mitsubishi Rayon Co., Ltd., Japan).

In the present invention, the amount of component (E) is from 0.01 to 1 part by weight, preferably from 0.05 to 0.8 part by weight, more preferably from 0.08 to 0.6 part by weight, still more preferably from 0.1 to 0.4 part by weight, relative to 100 parts by weight of the above-mentioned resin component (A). When the amount of component (E) exceeds 1 part by weight, the mechanical properties of the resin composition become disadvantageously poor. On the other hand, when the amount of component (E) is less than 0.01 part by weight, the flame retardancy of the resin composition is disadvantageously lowered, so that the dripping of flaming particles occurs when the resin composition is on fire.

In the present invention, if desired, any of various additives, such as a colorant, a lubricant, a mold release agent, a thermal stabilizer, an antioxidant, an ultraviolet absorber and an antistatic agent, may be added to the aromatic polycarbonate resin composition.

The above-mentioned additives are generally used in an amount of 5 parts by weight or less, preferably 3 parts by weight or less, more preferably 1 part by weight or less, relative to 100 parts by weight of the aromatic polycarbonate resin composition.

Hereinbelow, explanations are given with respect to the method for producing the aromatic polycarbonate resin composition of the present invention.

The aromatic polycarbonate resin composition of the present invention can be produced by mixing the above-mentioned components (A) to (E), and optionally other components, in their respective amounts as mentioned above, followed by melt-kneading by means of a melt-kneader (e.g., an extruder). The mixing of the components can be performed by means of a conventional premixer, such as a tumbler and a ribbon blender. Further, the melt-kneading of the resultant mixture can be performed by means of a conventional melt-kneader, such as a single-screw extruder, a twin-screw extruder and a co-kneader. As mentioned above, in the present invention, the components may be mixed together prior to feeding into a melt-kneader; however, it is also possible to feed each of the components individually into a melt-kneader.

In the production of the aromatic polycarbonate resin composition of the present invention, there is no particular limitation with respect to the form of resin component (A), and resin component (A) may be in the form of, for example, pellets, a powder or a flake.

In the production of the aromatic polycarbonate resin composition of the present invention, it is preferred that, prior to feeding into a melt-kneader, component (B) is subjected to a chemical or physical treatment with component (C), to thereby bond component (C) to component (B) through a covalent bond, an ionic bond, an intermolecular force or a hydrogen bond.

The above-mentioned treatment of component (B) with component (C) can be performed, for example, by the following method. A predetermined amount of component (C) is contacted with component (B) by spraying, dripping, wetting, immersion or the like. If desired, component (C) may be used in a molten form, liquid form or gas form. Then, component (B) and component (C) are mixed together while stirring by means of a mechanical mixing apparatus (e.g., a Henschel mixer, a Nauter mixer, a V-blender or a tumbler). After the mixing, excess amounts of components are removed from the resultant mixture by volatilization, and the resultant mixture is dried. The above-mentioned mixing of components (B) and (C) while stirring may be performed at a temperature not higher than the melting point of component (C); however, it is more preferred to elevate the temperature of the mixture to a temperature which is equal to or higher than the melting point of component (C) so as to perform the mixing more effectively. The mixing time varies depending on the type of mixing apparatus used. However, the mixing time is generally from 1 minute to 3 hours, preferably from 2 minutes to 1 hour, more preferably from 3 minutes to 40 minutes, still more preferably from 5 minutes to 30 minutes. With respect to the mixing apparatus, it is especially preferred to use a Henschel mixer or a Nauter mixer, each of which is equipped with a heater. In the above-mentioned method, it is preferred that, after the mixing of components (B) and (C), an excess amount of component (C) is volatilized by pressure reduction and/or heating, and that the resultant mixture is thoroughly dried.

The melt-kneader used for producing the aromatic polycarbonate resin composition of the present invention is generally an extruder, preferably a twin-screw extruder. In the present invention, component (B) may be fed through a side feeder provided around a middle portion of the extruder. The melt-kneading is generally performed under conditions wherein the cylinder temperature is in the range of from 200 to 300° C., preferably from 220 to 270° C., and the revolution rate of the extruder is from 100 to 700 rpm, preferably from 200 to 500 rpm; however, during the melt-kneading, care must be taken to prevent the generation of an excess heat. Further, it is effective to provide an opening at a downstream portion of the extruder, so as to release the volatilized substances therefrom. In such a case, the volatilized substances may be released from the opening under reduced pressure. Furthermore, in general, the retention time of the resin composition in the extruder is generally in the range of from 10 to 60 seconds.

With respect to the method for producing a molded article from the aromatic polycarbonate resin composition of the present invention, there is no particular limitation. Examples of molding methods include injection molding, gas-assisted injection molding, extrusion molding, compression molding, blow molding and rotational molding. Among these methods, injection molding and extrusion molding are preferred, and injection molding is most preferred.

Examples of molded articles produced from the aromatic polycarbonate resin composition of the present invention include housings for computers (e.g., desktop computers and notebook computers), copying machines, printers, liquid crystal projectors, electric and electronic devices, portable telephones, portable information terminals, battery packs and household electric appliances; parts for frames of a liquid crystal backlight; interior parts of a copying machine; electric and electronic parts, such as resistors, terminals and deflection yokes for a television; parts for lighting apparatus; and flame retardant sheets (or insulating sheets) for electronic information devices.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, aromatic polycarbonate resin compositions were produced using the following components (A), (B), (C), (D) and (E), and mold release agent.

1. Component (A): Aromatic Polycarbonate

The following substances (A-1) and (A-2) are used as component (A).

(A-1): A bisphenol A polycarbonate produced from bisphenol A and diphenyl carbonate by melt transesterification, containing 300 ppm by weight of octadecyl-3-(3,5-di-t-butyl-4-hydroxyphenyl)propionate as a hindered phenol antioxidant, and having the following properties.

Weight average molecular weight (Mw)=21,800
Terminal phenolic hydroxyl group ratio (in terms of mole % of terminal phenolic hydroxyl groups, based on the total molar amount of all terminal groups)=35 mole %

The terminal phenolic hydroxyl group ratio was measured by nuclear magnetic resonance (NMR) spectroscopy.

(A-2): A bisphenol A polycarbonate (trade name: Panlite AD5503; produced by phosgene process and sold by Teijin Chemicals Ltd., Japan), which had a weight average molecular weight (Mw) of 15,300.

2. Component (B): Solid Inorganic Compound

The following substances (B-1), (B-2), (B-3), (B-4) and (B-5) are used as component (B).

(B-1): A talc having the following properties.
Average particle diameter=5 μm
Whiteness=96%
Apparent specific volume=2.3 ml/g
Specific surface area=8.5 m$^2$/g
Water content=0.2%
Oil absorption=0.51 ml/100 g
pH=8.9

The average particle diameter of (B-1) was measured by means of a particle size analyzer (trade name: SALD 2000; manufactured and sold by Shimadzu Corporation, Japan). Specifically, using the above-mentioned apparatus, the particle diameters of (B-1) particles were measured by a laser diffraction method, and the median diameter was obtained from the measured particle diameters and defined as the average particle diameter of (B-1).

The whiteness of (B-1) was measured in accordance with JIS P8123 using digital hunter ST (trade name; manufactured and sold by Toyo Seiki Co., Ltd., Japan).

The specific surface area of (B-1) was measured by the BET adsorption method using a specific surface area measuring apparatus (trade name: FlowSorb 2300; manufactured and sold by Shimadzu Corporation, Japan).

The water content of (B-1) was measured in accordance with JIS K5101 using a water content measuring apparatus (trade name: STAC-5100; manufactured and sold by Shimadzu Corporation, Japan).

The oil absorption and apparent specific volume of (B-1) were measured in accordance with JIS K5101.

The pH value of (B-1) was measured by the pH measuring method (boiling method) prescribed in JIS K5101.

(B-2): A mica (trade name: CLARITE MICA 200-D; manufactured and sold by KURARAY CO., LTD., Japan) having an average particle diameter of 90 μm, an average aspect ratio of 50 and an apparent specific gravity of 0.27 g/cm$^3$.

(B-3): A glass fiber (trade name: T-571; manufactured and sold by Nippon Electric Glass Co., Ltd., Japan) having an average diameter of 13 μm and a fiber length of 3 mm.

(B-4): A glass flake (trade name: REF-160; manufactured and sold by Nippon Sheet Glass Co., Ltd., Japan) having an average thickness of 5 μm and an average particle diameter of 160 μm.

(B-5): A hydrophobic fumed silica (trade name: Aerosil RY 200; manufactured and sold by Nippon Aerosil Co., Ltd., Japan) obtained by subjecting a fumed silica (produced by the vapor phase method) having a primary particle diameter of 12 nm to surface treatment with a polydimethylsiloxane.

3. Component (C): At Least One Compound Selected from the Group Consisting of an Organic Acid, an Organic Acid Ester, and an Organic Acid Anhydride The following substances (C-1), (C-2), (C-3), (C-4) and (C-5) are used as component (C).

(C-1): P-toluenesulfonic acid (guaranteed reagent, manufactured and sold by Wako Pure Chemical Industries, Ltd., Japan).

(C-2): Diphenylmethyl phosphate (DPMP) (guaranteed reagent, manufactured and sold by Wako Pure Chemical Industries, Ltd., Japan).

(C-3): Methyl p-toluenesulfonate (guaranteed reagent, manufactured and sold by Wako Pure Chemical Industries, Ltd., Japan).

(C-4): Isophthalic acid (guaranteed reagent, manufactured and sold by Wako Pure Chemical Industries, Ltd., Japan).

(C-5): Maleic anhydride (guaranteed reagent, manufactured and sold by Wako Pure Chemical Industries, Ltd., Japan).

4. Component (D): At Least One Organic Acid Metal Salt Selected from the Group Consisting of an Organic Acid Alkali Metal Salt and an Organic Acid Alkaline Earth Metal Salt The following substance (D-1) is used as component (D).

(D-1): Potassium perfluorobutanesulfonate (trade name: MEGAFACE F-114; manufactured and sold by DAINIPPON INK & CHEMICALS INC., Japan).

5. Component (E): Fluoropolymer

The following substance (E-1) is used as component (E).

(E-1): A powder mixture (trade name: Blendex 449; manufactured and sold by GE Speciality Chemicals Inc., U.S.A.) of a polytetrafluoroethylene (PTFE) and an acrylonitrile/styrene copolymer (AS), which mixture has a PTFE/AS weight ratio of 50/50.

6. Other Component (Mold release agent): Pentaerythritol tetrastearate (trade name: Unister H476; manufactured and sold by NOF Corporation, Japan).

EXAMPLES 1 TO 12 AND COMPARATIVE EXAMPLES 1 to 7

In each of Examples 1 to 12 and Comparative Examples 1 to 7, a flame retardant aromatic polycarbonate resin composition was produced by melt-kneading components (A), (B), (C), (D) and (E), and a mold release agent, in their respective amounts (parts by weight) as indicated in Table 1, by means of a twin-screw extruder. Specifically, the production of a flame retardant polycarbonate resin composition was performed as follows.

In each of Examples 1 to 3, Examples 7 to 12 and Comparative Examples 1 to 7, separately from the production of a polycarbonate resin composition, components (B) and (C) were mixed together in a weight ratio as indicated in Table 1, and the pH value of the resultant mixture was measured in accordance with JIS K5101. The results are as shown in Table 1. On the other hand, in each of Examples 4, 5 and 6, the pH value of a mixture of components (B) and (C), which was prepared during the course of the production of a polycarbonate resin composition, was measured as described below.

In each of Examples 1 to 12 and Comparative Examples 1 to 7, melt-kneading of the raw materials (i.e., components (A), (B), (C), (D) and (E), and the mold release agent) was performed by means of a twin-screw extruder (trade name: ZSK-25; manufactured and sold by Werner & Pfleiderer GmbH, Germany) (L/D=37) under conditions wherein the cylinder temperature was 250° C., the screw revolution rate was 250 rpm, and the extrusion rate of the resultant resin composition was 15 kg/hr.

During the melt-kneading, the temperature of the molten resin composition in the extruder was measured by means of a thermocouple which was provided at the die of the extruder. As a result, it was found that the molten resin temperature was in the range of from 260 to 270° C.

Further, during the melt-kneading, evaporation-removal of volatile substances was performed through a vent provided at a downstream potion of the extruder under reduced pressure, namely under a pressure of 0.005 MPa.

With respect to the raw materials fed to the twin-screw extruder, in each of Examples 1 to 3, Examples 7 to 12 and Comparative Examples 1 to 7, components (A), (B), (C), (D) and (E), and the mold release agent were preblended together for 10 minutes using a tumbler, and the resultant mixture was introduced into the extruder by means of a feeder.

On the other hand, in each of Examples 4, 5 and 6, only components (B) and (C) were preblended together in their respective amounts as indicated in Table 1 by means of a 10-liter Henschel mixer under conditions wherein the jacket temperature was adjusted to 200° C., the screw revolution rate was 1,450 rpm, and the preblending time was 10 minutes. The resultant mixture of components (B) and (C) was fed into the twin-screw extruder together with the remainder of the raw materials (i.e., components (A), (D) and (E), and a mold release agent) to perform melt-kneading of the raw materials. The pH value of the above-mentioned mixture of components (B) and (C) was measured in accordance with JIS K5101. The results are shown in Table 1.

By the above-mentioned melt-kneading of the raw materials, a polycarbonate resin composition was obtained in the form of pellets. The obtained pellets were dried at 120° C. for 5 hours and molded by means of an injection molding machine, thereby obtaining an injection-molded article. Using the obtained injection-molded article, various properties of the resin composition were evaluated. Specifically, various tests were performed as follows.

(1) Flame Retardancy

The dried pellets were subjected to an injection molding using an injection molding machine (trade name: Autoshot 100D; manufactured and sold by Fanuc LTD., Japan) at a cylinder temperature of 300° C. and a mold temperature of 80° C., to thereby obtain two types of strip specimens which have a thickness of 1.2 mm and a thickness of 0.75 mm, respectively. The strip specimens were maintained at 23° C. under a humidity of 50% for two days. With respect to the resultant strip specimens, the flame retardancy thereof was evaluated by the 50W (20 mm) Vertical Burning Test described in UL-94 standard. More specifically, the tests for "V-0", "V-1" and "V-2" as prescribed in UL-94 standard were performed (in the case where the evaluation by these tests was impossible, the flame retardancy of the specimen was evaluated as "NC" (non-classification)), wherein the level of the flame retardancy is as follows: V-0>V-1>V-2).

Further, in each of Examples 3 to 10, a strip specimen having a thickness of 1.0 mm was produced in the same manner as mentioned above and maintained under the same conditions as mentioned above. With respect to the resultant strip specimen, the flame retardancy thereof was evaluated by the 500 W (125 mm) Vertical Burning Test (5VB) described in UL-94 standard.

(2) Flexural Modulus

The dried pellets were subjected to an injection molding using an injection molding machine (trade name: Autoshot 50D; manufactured and sold by Fanuc LTD., Japan) at a cylinder temperature of 300° C. and a mold temperature of 80° C., to thereby obtain a strip specimen having a thickness of ⅛ inch. With respect to the obtained specimen, the flexural modulus (unit: MPa) thereof was measured in accordance with ASTM D790 at 23° C.

(3) Melt Index (MI)

The melt index (MI) (unit: g/10 min) of the dried pellets was measured in accordance with JIS K7210 at a furnace temperature of 300° C. under a load of 1.2 kg.

(4) Melt Index (MI) after Retention in the Molding Machine

The dried pellets of a resin composition were retained in an injection molding machine (trade name: Autoshot 50D; manufactured and sold by Fanuc LTD., Japan) at a cylinder temperature of 300° C. for 20 minutes. Then, from the resultant resin composition in a molten form was produced a strip specimen having a thickness of ⅛ inch. With respect to the produced strip specimen, the MI (unit: g/10 min) thereof was measured in accordance with JIS K7210 at a furnace temperature of 300° C. under a load of 1.2 kg.

(5) Thermal Aging Resistance

The dried pellets of a resin composition were subjected to an injection molding using an injection molding machine (trade name: Autoshot 50D; manufactured and sold by Fanuc LTD., Japan) at a cylinder temperature of 300° C. and a mold temperature of 80° C., to thereby obtain 5 dumbbell specimens, each having a thickness of ⅛ inch. The obtained 5 specimens were placed in a circulating hot air oven and maintained at 120° C. for 2,000 hours. Then, the 5 specimens were subjected to a tensile test in accordance with ASTM D638, and the thermal aging resistance was evaluated according to the following criteria:

◯: all of the 5 test specimens were broken after the tensile strength thereof had reached the yield point;

Δ: 1 to 4 test specimens were broken after the tensile strength thereof had reached the yield point; and x: all of the 5 test specimens were broken before the tensile strength thereof had reached the yield point.

(6) Resistance to Moist Heat

The dried pellets were subjected to an injection molding using an injection molding machine (trade name: Autoshot 50D; manufactured and sold by Fanuc LTD., Japan) at a cylinder temperature of 300° C. and a mold temperature of 80° C., to thereby obtain 5 dumbbell specimens, each having a thickness of ⅛ inch. The obtained 5 specimens were maintained at 80° C. under a relative humidity of 95% for 2,000 hours. The resultant 5 specimens were subjected to a tensile test in accordance with ASTM D638, and the resistance to moist heat was evaluated according to the following criteria:

○: all of the 5 test specimens were broken after the tensile strength thereof had reached the yield point;

Δ: 1 to 4 test specimens were broken after the tensile strength thereof had reached the yield point; and x: all of the 5 test specimens were broken before the tensile strength thereof had reached the yield point.

(7) Drop-Weight Impact Strength

The dried pellets were subjected to an injection molding using an injection molding machine (trade name: Autoshot 100D; manufactured and sold by Fanuc LTD., Japan) under conditions wherein the cylinder temperature was 300° C. and the mold temperature was 80° C., to thereby obtain a plate-shaped specimen (150 mm×150 mm×2 mm (thickness)). The obtained specimen was maintained at 23° C. under a humidity of 50% for 2 days. With respect to the resultant test specimen, a drop-weight impact test (falling dart impact test) was performed as follows. In the drop-weight impact test, a falling weight (a falling dart) made of stainless steel, which has a weight of 200 g and a spherical apex (diameter: ¾ inch (19 mm)), was used. The weight of the falling weight was adjusted by attaching thereto a load-adjusting weight, and the falling weight was allowed to fall from a height of 150 cm to the test specimen. This falling operation was repeated several times while varying the weight of falling weight, to thereby measure the energy value (weight of the falling weight×falling height; unit: kgf·cm) at which the falling weight breaks and penetrates through the test specimen.

Further, in the drop-weight impact test, with respect to a test specimen which was broken by the penetration of the falling weight, the state of breakage was observed to thereby evaluate the ductility and brittleness of the specimen. When the falling weight did not penetrate through a specimen, the state of breakage was evaluated as "no penetration".

The results are shown in Tables 1 to 3.

EXAMPLES 13

The aromatic polycarbonate resin composition produced in Example 4 was shaped into a sheet having a thickness of 0.7 mm by means of a 50 mm single-screw sheet extruder (trade name: PG50-32V; manufactured and sold by PLA GIKEN CO., LTD., Japan) (L/D=32) provided with a T-die and a vent. The shaping was performed under conditions wherein the cylinder temperature was 290° C., the screw revolution rate was 50 rpm and the extrusion rate was 30 to 35 kg/hr.

The T-die had a slit width of 1 mm and a slit length of 300 mm.

The thickness of the sheet extruded through the T-die was adjusted by means of a roll having a temperature of 140° C., wherein the revolution rate of the roll was adjusted within the range of from 2 to 4 m/min, taking into consideration the extrusion rate of the sheet, thereby obtaining a sheet having a thickness of 0.7 mm.

From the obtained sheet, 5 test specimens were cut out, each of which had a width of 12.7 mm and a length (in an extrusion direction of the sheet) of 127 mm. Then, the test specimens were subjected to a 20 mm Vertical Burning Test in accordance with UL-94 standard. As a result, it was found that the total burning time of the 5 test specimens was 32 seconds, that no dripping of flaming particles was observed with respect to the 5 test specimens, and that, hence, the flame retardancy of the obtained sheet was "V-0".

EXAMPLES 14 AND 15

In each of Examples 14 and 15, a polycarbonate flame retardant resin composition was produced by performing the melt-kneading in substantially the same manner as in Example 1, except that the ratio of the raw materials was changed to that indicated in Table 4.

The acryronitrile/styrene copolymer resin (AS resin) and the methylmetacrylate/butadiene/styrene copolymer resin (MBS resin) which were, respectively, used in Examples 14 and 15 are as follows.

(AS resin): An acrylonitrile/styrene copolymer resin containing 27% by weight of acrylonitrile monomer units and 73% by weight of styrene monomer units and having a weight average molecular weight (Mw) of 100,000.

(MBS resin): A metyl methacrylate/butadiene/styrene copolymer resin (KaneAce M-511, manufactured and sold by Kaneka Corporation, Japan).

The obtained pellets were dried at 120° C. for 5 hours, and the dried pellets were subjected to an injection molding by means of an injection molding machine, to thereby obtain injection-molded articles. Using the obtained injection-molded articles, various properties of the resin composition were evaluated in the same manner as in Example 1.

The results are shown in Table 4.

TABLE 1

|  |  | Example 1 | Example 2 | Example 3 | Example 4 | Example 5 | Example 6 | Example 7 |
|---|---|---|---|---|---|---|---|---|
| Component (A) | A-1 (parts by weight) | 100 | 100 | 100 | 100 | 100 | 0 | 100 |
|  | A-2 (parts by weight) | 0 | 0 | 0 | 0 | 0 | 100 | 0 |
| Component (B) | B-1 (parts by weight) | 8 | 8 | 0 | 5 | 0.5 | 10 | 20 |
|  | B-2 (parts by weight) | 0 | 0 | 10 | 0 | 0 | 0 | 0 |
|  | B-5 (parts by weight) | 0 | 0.3 | 0.3 | 0 | 0 | 0 | 0 |
| Component (C) | C-1 (parts by weight) | 0.1 | 0 | 0.03 | 0.2 | 0.02 | 0.4 | 0.5 |
|  | C-2 (parts by weight) | 0 | 0.1 | 0 | 0 | 0 | 0 | 0 |
| Component (D) | D-1 (parts by weight) | 0.01 | 0.01 | 0.1 | 0.1 | 0.1 | 0.1 | 0.15 |
| Component (E) | E-1 (parts by weight) | 0.2 | 0.2 | 0.6 | 0.8 | 0.8 | 0.8 | 1 |
| Other component | Mold release agent (parts by weight) | 0 | 0 | 0 | 0.2 | 0.2 | 0.2 | 0.5 |
| pH value of the mixture of components (B) and (C) |  | 7.7 | 7.5 | 4.2 | 4.5 | 4.3 | 4.4 | 6.2 |

TABLE 1-continued

|  | Example 1 | Example 2 | Example 3 | Example 4 | Example 5 | Example 6 | Example 7 |
|---|---|---|---|---|---|---|---|
| Flame retardancy (sample thickness: 1.2 mm) | V-0 | V-1 | V-0 | V-0 | V-0 | V-0 | V-0 |
| Flame retardancy (sample thickness: 0.75 mm) | —[1] | —[1] | V-0 | V-0 | V-0 | V-0 | V-0 |
| Flame retardancy (sample thickness: 1.0 mm) | —[1] | —[1] | 5VB | 5VB | 5VB | 5VB | 5VB |
| Flexural modulus (MPa) | 3,150 | 3,120 | 3,200 | 2,900 | 2,400 | 3,450 | 3,700 |
| MI value (g/10 min.) | 16 | 17 | 18 | 19 | 25 | 27 | 10 |
| MI value after the retention (g/10 min.) | 18 | 25 | 22 | 21 | 26 | 29 | 12 |
| Thermal aging resistance | ○ | ○ | ○ | ○ | ○ | —[1] | ○ |
| Resistance to moist heat | ○ | ○ | ○ | ○ | ○ | —[1] | ○ |
| Drop-weight impact test — Energy value (kgf · cm) | >780[2] | >780[2] | >780[2] | >780[2] | >780[2] | >780[2] | >780[2] |
| Drop-weight impact test — State of breakage | No penetration | No penetration | No penetration | No penetration | No penetration | No penetration | No penetration |

Notes:
[1] — means that the measurement was not performed.
[2] >780 means that, even when a load-adjusting weight having a weight of 5 kg was attached to the falling weight (200 g) so that the impact load became 780 kgf · cm, the falling weight did not penetrate through the test specimen.

TABLE 2

|  |  | Example 8 | Example 9 | Example 10 | Example 11 | Example 12 |
|---|---|---|---|---|---|---|
| Component (A) | A-1 (parts by weight) | 100 | 100 | 100 | 100 | 100 |
| Component (B) | B-1 (parts by weight) | 10 | 10 | 10 | 0 | 0 |
|  | B-3 (parts by weight) | 0 | 0 | 0 | 5 | 0 |
|  | B-4 (parts by weight) | 0 | 0 | 0 | 0 | 5 |
| Component (C) | C-1 (parts by weight) | 0 | 0 | 0 | 0.02 | 0.02 |
|  | C-3 (parts by weight) | 0.2 | 0 | 0 | 0 | 0 |
|  | C-4 (parts by weight) | 0 | 0.1 | 0 | 0 | 0 |
|  | C-5 (parts by weight) | 0 | 0 | 0.1 | 0 | 0 |
| Component (D) | D-1 (parts by weight) | 0.1 | 0.1 | 0.1 | 0.15 | 0.15 |
| Component (E) | E-1 (parts by weight) | 0.6 | 0.6 | 0.6 | 0.8 | 0.8 |
| pH value of the mixture of Components (B) and (C) |  | 5.2 | 6.5 | 4.2 | 4.5 | 4.3 |
| Flame retardancy (sample thickness: 1.2 mm) |  | V-0 | V-0 | V-0 | V-0 | V-0 |
| Flame retardancy (sample thickness: 0.75 mm) |  | V-0 | V-0 | V-0 | —[1] | —[1] |
| Flame retardancy (sample thickness: 1.0 mm) |  | 5VB | 5VB | 5VB | —[1] | —[1] |
| Flexural modulus (MPa) |  | 3,200 | 3,150 | 3,200 | 3,000 | 2,700 |
| MI value (g/10 min.) |  | 14 | 17 | 15 | 18 | 21 |
| MI value after the retention (g/10 min.) |  | 16 | 21 | 19 | 23 | 24 |
| Thermal aging resistance |  | ○ | ○ | ○ | ○ | ○ |
| Resistance to moist heat |  | ○ | ○ | ○ | ○ | ○ |
| Drop-weight impact test | Energy value (kgf · cm) | >780[2] | >780[2] | >780[2] | —[1] | —[1] |
|  | State of breakage | No penetration | No penetration | No penetration | —[1] | —[1] |

Note:
[1] — means that the measurement was not performed.
[2] >780 means that, even when a load-adjusting weight having a weight of 5 kg was attached to the falling weight (200 g) so that the impact load became 780 kgf · cm, the falling weight did not penetrate through the test specimen.

TABLE 3

|  |  | Compara. Ex. 1 | Compara. Ex. 2 | Compara. Ex. 3 | Compara. Ex. 4 | Compara. Ex. 5 | Compara. Ex. 6 | Compara. Ex. 7 |
|---|---|---|---|---|---|---|---|---|
| Component (A) | A-1 (parts by weight) | 100 | 100 | 100 | 100 | 100 | 100 | 100 |
| Component (B) | B-1 (parts by weight) | 0 | 8 | 8 | 8 | 0 | 8 | 8 |

TABLE 3-continued

|  |  | Compara. Ex. 1 | Compara. Ex. 2 | Compara. Ex. 3 | Compara. Ex. 4 | Compara. Ex. 5 | Compara. Ex. 6 | Compara. Ex. 7 |
|---|---|---|---|---|---|---|---|---|
| Component (C) | C-1 (parts by weight) | 0 | 0 | 0.1 | 0.1 | 0 | 0.1 | 0.4 |
| Component (D) | D-1 (parts by weight) | 0 | 0.01 | 0 | 0 | 0.01 | 0.01 | 0.01 |
| Component (E) | E-1 (parts by weight) | 0 | 0.2 | 0.2 | 0 | 0.2 | 0 | 0.2 |
| pH value of the mixture of components (B) and (C) | | —[1] | 8.9 | 7.7 | 7.7 | —[1] | 7.7 | 2.5 |
| Flame retardancy (sample thickness: 1.2 mm) | | V-2 | NC | V-2 | V-2 | V-2 | V-2 | V-2 |
| Flame retardancy (sample thickness: 0.75 mm) | | —[1] | —[1] | —[1] | —[1] | —[1] | —[1] | —[1] |
| Flame retardancy (sample thickness: 1.0 mm) | | —[1] | —[1] | —[1] | —[1] | —[1] | —[1] | —[1] |
| Flexural modulus (MPa) | | 2,400 | 3,100 | 3,100 | 3,100 | 2,400 | 31,000 | 31,000 |
| MI value (g/10 min.) | | 19 | 45 | 17 | 18 | —[1] | —[1] | 27 |
| MI value after the retention (g/10 min.) | | 21 | —[1] | 19 | 19 | —[1] | —[1] | 52 |
| Thermal aging resistance | | ○ | x | ○ | —[1] | —[1] | —[1] | —[1] |
| Resistance to moist heat | | ○ | x | ○ | —[1] | —[1] | —[1] | —[1] |
| Drop-weight impact test | Energy value (kgf · cm) | >780[2] | <150[3] | >780[2] | —[1] | —[1] | —[1] | <150[3] |
| | State of breakage | No penetration | Brittle fracture | No penetration | —[1] | —[1] | —[1] | Brittle fracture |

Note:
[1] — means that the measurement was not performed.
[2] >780 means that, even when a load-adjusting weight having a weight of 5 kg was attached to the falling weight (200 g) so that the impact load became 780 kgf · cm, the falling weight did not penetrate through the test specimen.
[3] <150 means that, when a load-adjusting weight having a weight of 800 g was attached to the falling weight so that the impact load became 150 kgf · cm, the falling weight broke and penetrated through the test specimen.

TABLE 4

|  |  | Example 14 | Example 15 |
|---|---|---|---|
| Component (A) | A-1 (parts by weight) | 97 | 95 |
| | AS (parts by weight) | 3 | 0 |
| | MBS (parts by weight) | 0 | 5 |
| Component (B) | B-1 (parts by weight) | 5 | 5 |
| Component (C) | C-1 (parts by weight) | 0.2 | 0.2 |
| Component (D) | D-1 (parts by weight) | 0.15 | 0.15 |
| Component (E) | E-1 (parts by weight) | 0.6 | 0.6 |
| pH value of the mixture of components (B) and (C) | | 4.5 | 4.5 |
| Flame retardancy (sample thickness: 1.2 mm) | | V – 0 | V – 0 |
| Flame retardancy (sample thickness: 0.75 mm) | | —[1] | —[1] |
| Flame retardancy (sample thickness: 1.0 mm) | | —[1] | —[1] |
| Flexural modulus (MPa) | | 2,900 | 2,550 |
| MI value (g/10 min.) | | 19 | 16 |
| MI value after the retention (g/10 min.) | | 22 | 20 |
| Thermal aging resistance | | —[1] | —[1] |
| Resistance to moist heat | | —[1] | —[1] |
| Drop-weight impact test | Energy value (kgf · cm) | >780[2] | >780[2] |
| | State of breakage | No penetration | No penetration |

Note:
[1] — means that the measurement was not performed.
[2] >780 means that, even when a load-adjusting weight having a weight of 5 kg was attached to the falling weight (200 g) so that the impact load became 780 kgf · cm, the falling weight did not penetrate through the test specimen.

INDUSTRIAL APPLICABILITY

The aromatic polycarbonate resin composition of the present invention is advantageous not only in that it exhibits an excellent flame retardancy (even in the form of a thin shaped article) without using a bromine compound or a phosphorus compound as a flame retardant, but also in that it exhibits excellent melt stability, so that the range of temperature employable for the molding of the resin composition becomes broad. Further, the aromatic polycarbonate resin composition of the present invention has excellent thermal aging resistance and resistance to moist heat, so that it can be advantageously used as a raw material for producing various shaped articles (e.g., an injection-molded article and an extrusion-molded article).

The invention claimed is:

1. An aromatic polycarbonate resin composition comprising:
    100 parts by weight of a resin component (A) mainly comprising an aromatic polycarbonate,
    0.1 to 200 parts by weight of a solid inorganic compound (B),
    at least one compound (C) selected from the group consisting of an organic acid, an organic sulfonic acid ester, and an organic monomeric acid anhydride,
    0.001 to 1 part by weight of at feast one organic acid metal salt (D) selected from the group consisting of an organic acid alkali metal salt and an organic acid alkaline earth metal salt, and
    0.01 to 1 part by weight of a fluoropolymer (E),
    wherein said compound (C) is present in an amount wherein a mixture of said inorganic compound (B) and said compound (C) exhibits a pH value of from 4 to 8.

2. The aromatic polycarbonate resin composition according to claim 1, wherein said solid inorganic compound (B) is at least one silicate compound selected from the group consisting of a plate-shaped silicate compound, a needle-shaped silicate compound and a fibrous silicate compound.

3. The aromatic polycarbonate resin composition according to claim 2, wherein said at least one silicate compound is selected from the group consisting of talc, mica, a glass flake and a glass fiber.

4. The aromatic polycarbonate resin composition according to claim 3, wherein said at least one silicate compound is selected from the group consisting of talc and mica.

5. The aromatic polycarbonate resin composition according to claim 1, wherein said compound (C) is selected from the group consisting of an organic sulfonic acid, an organic sulfonic acid ester, and an organic carboxylic acid.

6. The aromatic polycarbonate resin composition according to claim 1, wherein the amount of said solid inorganic compound (B) is 1 to 20 parts by weight.

7. An injection molded article comprising the aromatic polycarbonate resin composition of any one of claims 1 to 6.

8. An extrusion molded article comprising the aromatic polycarbonate resin composition of any one of claims 1 to 6.

9. The aromatic polycarbonate resin composition according to claim 1, wherein the amount of said compound (C) is frpm 0.02 to 0.5 part by weight.

* * * * *